Sept. 22, 1925.
E. A. EOS ET AL
V-CLUTCH
Original Filed May 21, 1920
1,554,206
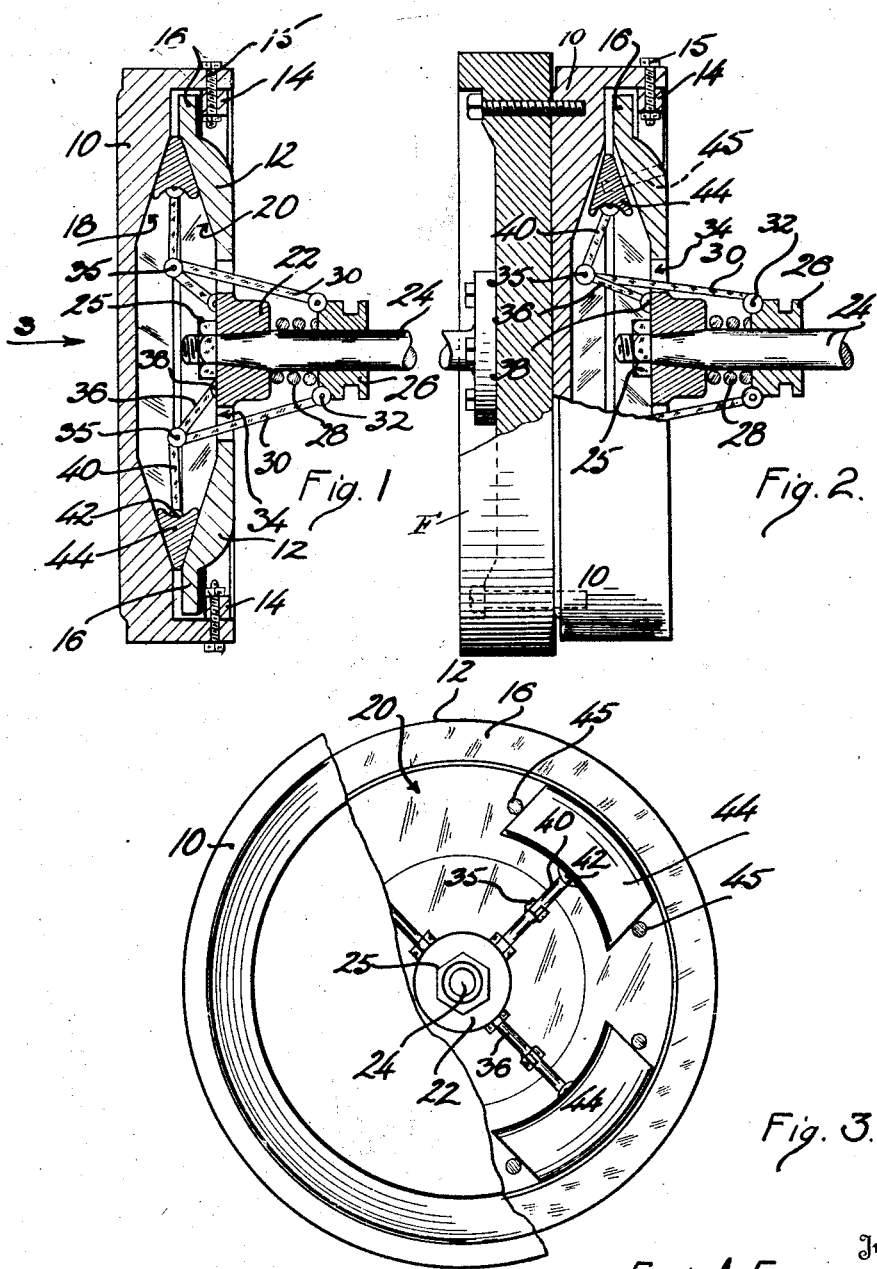
Inventor
Eric A. Eos
C. T. Hogberg
Attorney Patented Sept. 22, 1925.

1,554,206

UNITED STATES PATENT OFFICE.

ERIC A. EOS AND CARL T. HOGBERG, OF DENVER, COLORADO, ASSIGNORS OF ONE-FOURTH TO HENRY SOBOL AND ONE-FOURTH TO BENJAMIN F. ENGLANDER, BOTH OF DENVER, COLORADO.

V CLUTCH.

Substitute for application Serial No. 383,131, filed May 21, 1920. This application filed July 3, 1925. Serial No. 41,445.

*To all whom it may concern:*

Be it known that we, ERIC A. EOS and CARL T. HOGBERG, a subject of the King of Sweden and a citizen of the United States, respectively, residing at the city and county of Denver and State of Colorado, have invented certain new and useful Improvements in V Clutches; and we do declare the following to be a full, clear, and exact description of the invention, such as will enable others skilled in the art to which it appertains to make and use the same, reference being had to the accompanying drawings, and to the characters of reference marked thereon, which form a part of this application.

The object of this invention is to provide a clutch for power transmission which is thoroughly efficient, has unusually long life, and is unusually cheap to manufacture.

Briefly, the invention comprises a pair of opposed members, one of which drives and one of which is driven, said members having opposed inclined faces adapted to receive between them a series of radially movable wedge-like or V-shaped members which may be projected into engagement with said inclined faces or withdrawn from such engagement.

In the drawings:

Fig. 1 is a vertical section of the invention showing the wedges in engaging position.

Fig. 2 is a similar view, partially in elevation, showing the wedges withdrawn.

Fig. 3 is a view looking in the direction of arrow 3 of Fig. 1, showing a portion of one of the members broken away to disclose the internal structure.

A rotary disc 10 is adapted to be bolted to a fly-wheel F (Fig. 2) or secured thereto in any other desirable manner, and driven from a source of power, while a disc 12 is positioned within the member 10 and may be retained therein by means of a ring 14, which may be bolted to the overhanging portion of the disc 10 as indicated at 15 or may be otherwise secured, as by threading (not shown). The ring 14 is adapted to engage the annular portion 16 at the periphery of the disc 12 to maintain the relation of the discs when the wedges are in operative position. The disc 10 is provided with an annular inclined face 18, and the disc 12 with an annular inclined face 20, opposing the face 18. The disc 12 is provided with a hub 22, which receives a driven shaft 24 which may be tapered as shown and secured in the hub by a nut 25. A collar 26 is slidably disposed upon the shaft 24 and is engaged by a spring 28, positioned around the shaft between the hub 22 and the collar to normally maintain the collar in the position shown in Fig. 1. The collar 26 is adapted to be moved into the position shown in Fig. 2, against the tension of the spring 28 by any suitable yoke or other device (not shown). A series of links 30 are pivoted to the collar 26 at 32 and project through openings 34 in the disc 12 to points between the discs where they are pivoted at 35 to swinging arms 36, which in turn are pivoted at their opposite ends, as indicated at 38, to the hub portion 22 of the disc 12. The force rod 40 is also pivoted at each point 35, and by means of a pivotal connection 42 operates a V-shaped wedge or clutch shoe 44 adapted to engage the inclined faces 18 and 20. The shoes 44 may be of fiber or of some metal which will serve the purpose. A pin 45 is mounted in the disc 12 at each end of each shoe 44 for the purpose of guiding the respective shoe in its radial movement.

In the operation of the device the disc 10 will be driven from a drive shaft, as above described. In transmitting power to the shaft 24, the clutch blocks 44 will be initially withdrawn to the position of Fig. 2 by movement of the collar 26. The collar 26 will then be gradually released to allow the spring 28 to move it outwardly along the shaft 24 so that the links 30 will swing the pivots 35 in arcs of circles, thereby urging the force rods 40 radially outward and causing the clutch shoes 44 gradually to engage the inclined faces 18 and 20. When the collar 26 is fully released to allow the spring 28 to exert its full pressure, the frictional engagement of the shoes 44 with the two inclined faces will cause the disc 12 to be rotated in unison with the drive disc 10, thereby driving the shaft 24.

The ring 14 serves the specific function of retaining the disc 12 in its relation with the disc 10, by preventing its being forced away from said disc 10 when the shoes 44 are projected into engaging position.

Having now described our invention, what we claim is:

1. A clutch comprising a pair of opposed relatively rotatable members having oppositely disposed radially inclined faces converging towards the outer edges of said members, wedge shaped shoes mounted between the inclined faces of said members and means for projecting said shoes radially into frictional engagement with said inclined faces whereby one member may drive the other.

2. A clutch comprising a pair of opposed relatively rotatable members having oppositely disposed radially inclined faces converging towards the outer edges of said members, means preventing longitudinal separation of said members, wedge shaped shoes mounted between the inclined faces of said members and means for projecting said shoes radially into frictional engagement with said inclined faces whereby one member may drive the other.

3. A clutch comprising a pair of opposed relatively rotatable members having oppositely disposed radially inclined faces converging towards the outer edges of said members, means preventing longitudinal separation of said members, a plurality of wedge shaped shoes mounted between the inclined faces of said members for frictional engagement therewith, and means for simultaneously projecting said shoes radially into engagement with said inclined faces whereby one member may drive the other.

4. A clutch comprising a pair of opposed rotary members mounted so as to be relatively rotatable and having opposed inclined faces, a plurality of clutch shoes mounted between said members and adapted to be moved radially into frictional engagement with said faces simultaneously, a connection supporting each shoe, and means for radially moving each connection and the respective shoe.

5. A clutch comprising a pair of opposed relatively rotatable members having oppositely disposed radially inclined faces converging towards the outer edges of said members, one of said members being larger than the other and having an annular flange projecting beyond the other member, an annular ring secured to said flange and projecting within the edge of said other member, whereby longitudinal separation is prevented, wedge shaped shoes mounted between the inclined faces of said members and means for simultaneously projecting said shoes radially into frictional engagement with said inclined faces whereby one member may drive the other.

In testimony whereof we affix our signatures.

ERIC A. EOS.
CARL T. HOGBERG.